United States Patent [19]

Partus

[11] 4,174,842

[45] Nov. 20, 1979

[54] NON-CONTACTING SEAL FOR TREATING CHAMBER THROUGH WHICH ELONGATED MATERIAL IS MOVED

[75] Inventor: Fred P. Partus, Atlanta, Ga.

[73] Assignee: Western Electric Company, Incorporated, New York, N.Y.

[21] Appl. No.: 892,223

[22] Filed: Mar. 31, 1978

[51] Int. Cl.[2] .......................... C03B 37/00; F16J 15/40

[52] U.S. Cl. .................................. 277/3; 277/DIG. 7; 65/2; 264/85; 34/242

[58] Field of Search .......... 277/3, 27, DIG. 7, 237 R; 65/2, 13, 32, 157; 264/85; 34/242

[56] References Cited

U.S. PATENT DOCUMENTS

| | | | |
|---|---|---|---|
| 3,245,334 | 4/1966 | Long | 34/242 |
| 3,410,672 | 11/1968 | DeLajarte | 65/2 X |
| 3,927,540 | 12/1975 | Tanaka et al. | 34/242 X |
| 4,030,901 | 6/1977 | Kaiser | 65/2 |

FOREIGN PATENT DOCUMENTS

| | | | |
|---|---|---|---|
| 842652 | 5/1970 | Canada | 277/237 R |
| 530468 | 12/1940 | United Kingdom | 65/2 |

*Primary Examiner*—Robert S. Ward, Jr.
*Attorney, Agent, or Firm*—E. W. Somers

[57] ABSTRACT

A device (80) for sealing a furnace (50) which is used to draw a fiber (52) from a rod-like preform (51) includes a housing (82) having a cavity (121) for receiving a disc (111). The disc (111) is suspended for movement in the cavity in a plane lateral to the preform that extends through a center opening (116) in the disc and into the furnace. An inert gas is supplied to the cavity and directed inwardly through radially disposed passageways (118—118) in the disc (111) to impinge on the preform and split into two streams which move along the preform in opposite directions to prevent the entry of ambient air into, as well as the escape of gas from within, the furnace. The inert gas also causes the disc to be moved within the cavity to compensate for irregularities in the preform or for its misalignment from a vertical axis of the furnace, and provides a cushion so that contact between the disc and the preform is avoided.

11 Claims, 20 Drawing Figures

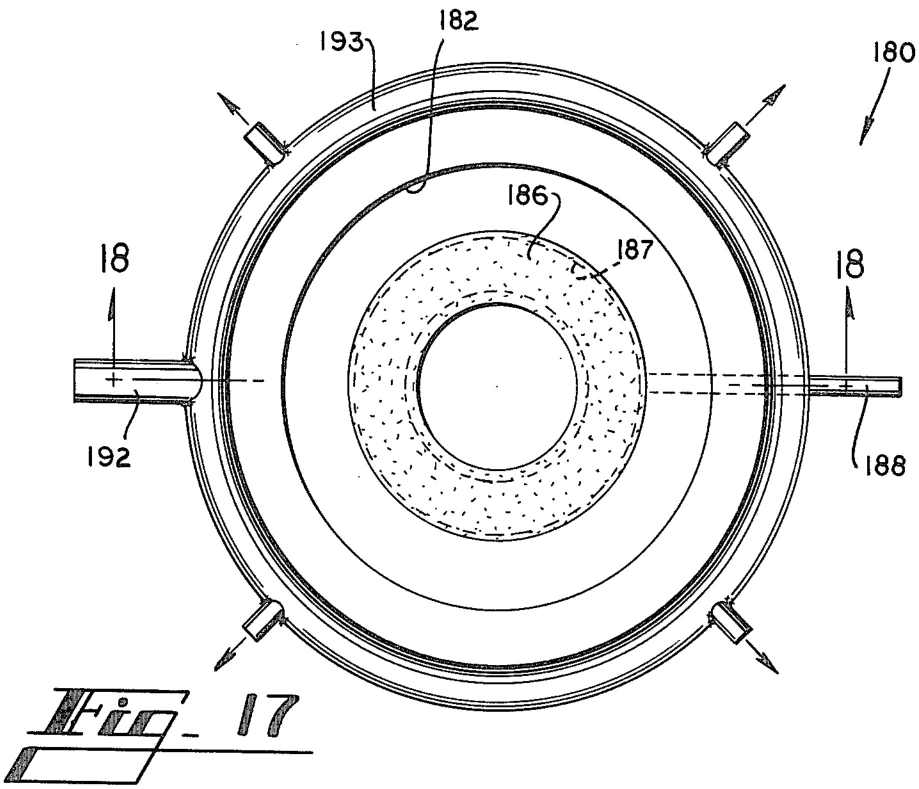
Fig_ 17
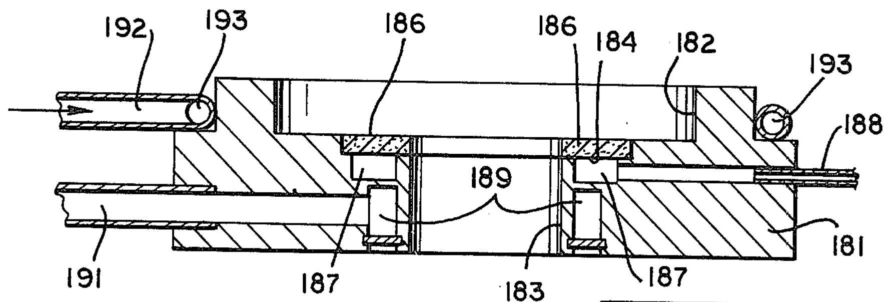
Fig_ 18
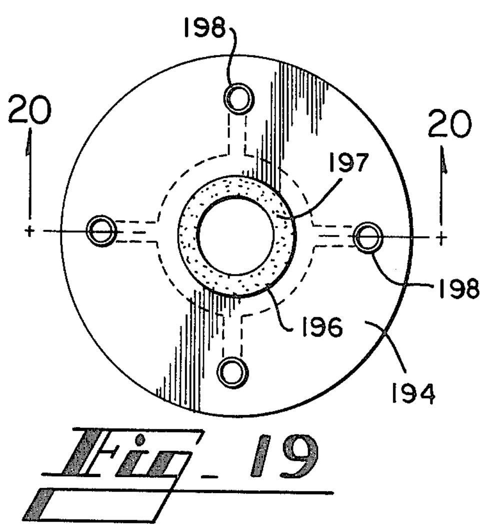
Fig_ 19
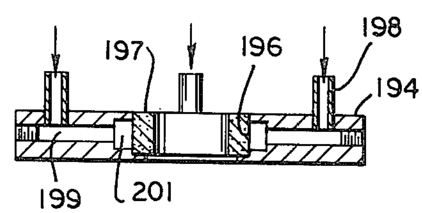
Fig_ 20

NON-CONTACTING SEAL FOR TREATING CHAMBER THROUGH WHICH ELONGATED MATERIAL IS MOVED

TECHNICAL FIELD

This invention relates to a non-contacting seal for a treating chamber through which an elongated material is moved, and more particularly, to a device for sealing a furnace which is used in the drawing of fiber lightguides.

BACKGROUND ART

In the production of fiber lightguides which are used, for example, in optical communications systems, a layered preform to be drawn through a high temperature furnace and having an outside diameter of about 12 mm and a length of about 70 cm is suspended with its axis oriented vertically. The furnace may be one such as that shown, for example, in U.S. Pat. No. 4,030,901, which issued on June 21, 1977 in the name of P. Kaiser and which includes a chamber heated to a temperature above 2000° C. and typically filled with an inert gas. As the drawing process is continued, the preform is moved downwardly through an opening in an upper end of the furnace to maintain a lower end of the preform within the heated chamber.

Because of the opening in the upper end of the furnace, a seal must be provided to maintain an inert, relatively high purity atmosphere within the furnace. If a high purity inert atmosphere is not maintained, a heating element and other furnace components will oxidize and deposits will form on the preform and fiber lightguide surface. The provision of a seal at the upper end of the furnace is also necessary to prevent air from being drawn into an opening in a lower end of the furnace and moved through the chamber and out the top, especially when a spent preform is removed from the furnace. Although furnaces are available which do not use inert atmospheres, their heating chambers must be sealed off from ambient conditions to provide heat stability, while preventing turbulence, to control the diameter of the drawn fiber.

It is also desirable that the furnace seal be non-contacting with the preform extending therethrough in order to avoid strength reduction in the drawn fiber. The objectionable characteristics of fibers which are drawn from preforms that have been abraded due to surface contact were discussed in a talk entitled "Effect of Drawing Tension and Preform Surface Condition on the Strength of Optical Fibers" which was presented by B. K. Tariyal and F. P. Partus in October, 1977 at the Ceramics Conference in New Bedford, Pennsylvania.

The seal should also be self-centering to accommodate varying preform characteristics such as different diameter preforms, while having the capability of accommodating preforms which are misaligned with a vertical axis of the furnace. Moreover, the preform frequently develops a bow when it is collapsed after it has been layered. The maximum displacement of the bowed configuration, which may be on the order of 6 mm, must be accommodated by the furnace seal.

The prior art includes U.S. Pat. No. 3,245,334 which shows a non-contacting, but non-adjustable, air bearing type seal through which an elongated material is advanced from one chamber into another, and hereinbefore mentioned U.S. Pat. No. 4,030,908 which shows a contacting seal. In U.S. Pat. No. 3,927,544, sealing boxes at opposite ends of a treating chamber have a clearance from a fibrous material, which is large enough to avoid frictional engagement but small enough to effect a seal. Nowhere in the known prior art is there disclosed a seal which is used in cooperation with a furnace to draw fiber lightguides from a preform and which meets all of the hereinbefore-mentioned requirements.

DISCLOSURE OF THE INVENTION

The foregoing problems are overcome by drawing a fiber lightguide or other elongated material from a preform in a furnace which is provided with a sealing apparatus made in accordance with this invention. The apparatus for sealing an entrance of a treating chamber into which elongated material extends comprises a disc-shaped member adjacent to the entrance and having a centrally disposed opening through which the elongated material extends into the treating chamber without contacting the disc-shaped member when the opening is centered about the elongated material. Means are provided for supporting the disc-shaped member to move in a plane substantially perpendicular to the elongated material. A gas is flowed through the the disc-shaped member into the opening and into engagement with the elongated material at such an angle that the disc-shaped member is moved in the plane relative to the elongated material to center its opening about the elongated material. Also, the gas is flowed into engagement with the elongated material at such an angle that it divides into streams which move along the elongated material in opposite directions to seal the treating chamber.

More particularly, the apparatus includes a housing which is mounted adjacent to the entrance to the treating chamber and which includes spaced annular support members for defining a cavity in which is received a disc having a plurality of passageways disposed radially about a path of travel of a preform. Each annular support member includes an annular opening which communicates with the cavity and a porous ring bearing which is received in the annular opening and engages a face of the disc. An inert gas is supplied to the annular opening and moves through the bearings to suspend the disc and permit its movement in a plane which is substantially perpendicular to the path of travel of the preform without causing unbalancing moments that could cant the disc. Inert gas which is also supplied through the radial passageways in the disc impinges on the preform to concentrically dispose the disc about the preform and divides into two streams which move along the preform in opposite directions to seal the furnace atmosphere from ambient contaminants.

BRIEF DESCRIPTION OF THE DRAWINGS

Other features of the present invention will be more readily understood from the following detailed description of specific embodiments thereof when read in conjunction with the accompanying drawings, in which:

FIG. 17 is a plan view of the seal shown in FIG. 16 with a disc thereof removed;

FIG. 18 is an elevation view in section of the seal shown in FIG. 17 and taken along FIGS. 18—18 thereof;

FIG. 19 is a plan view of the disc in the seal of FIG. 18; and

FIG. 20 is an elevation view in section of the disc shown in FIG. 19 and taken along the lines 20—20 thereof.

DETAILED DESCRIPTION

Figure 1:
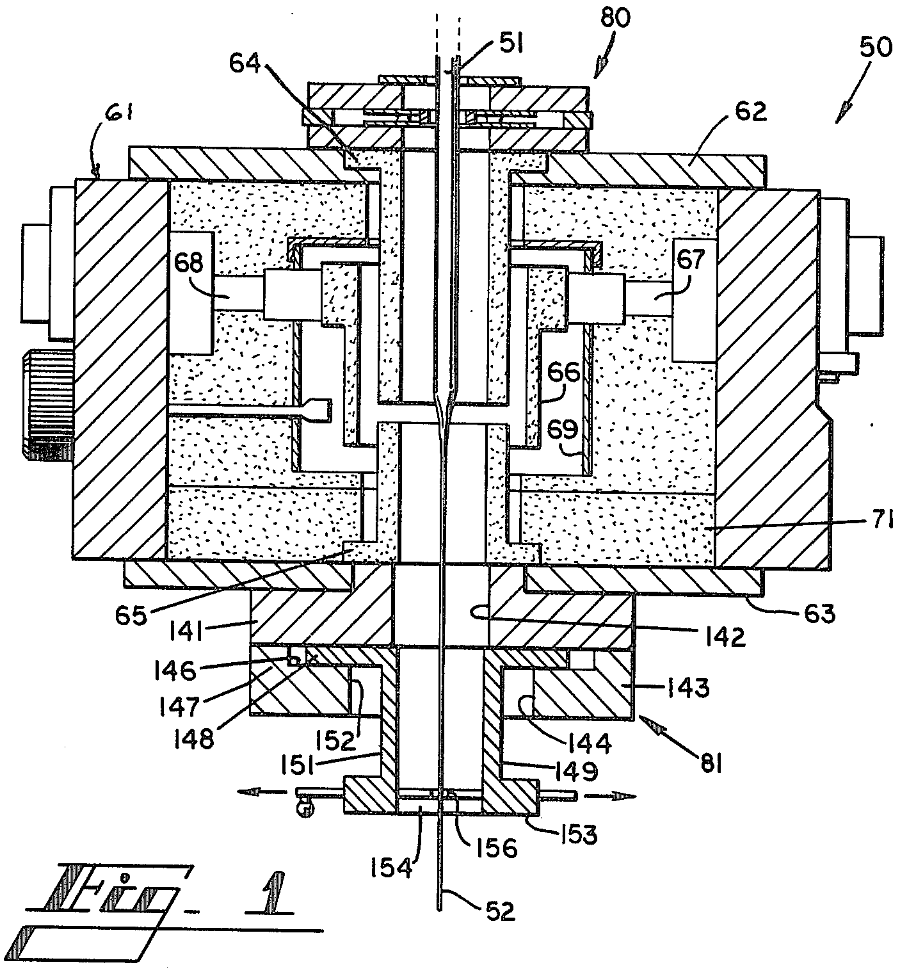
FIG. 1 is an elevation view, partially in section, showing a furnace which is used to draw a fiber lightguide from a preform and which includes a seal made in accordance with this invention.

Referring now to FIG. 1, there is shown a furnace, which is designated generally by the numeral 50, and which is used to draw a fiber lightguide 52 from a layered glass preform 51. The furnace 50 includes an enclosure 61 having a top cover plate 62 and a bottom cover plate 63 and also includes two axially aligned and spaced graphite hearths 64 and 65 into which the preform 51 extends and through which the fiber lightguide 52 is drawn. A graphite heating element 66 is disposed concentrically about portions of the graphite hearths 63 and 64 and is supplied from a power source (not shown) through connections 67 and 68. The graphite heating element 66 is enclosed within a barrel reflector 69 which reflects heat inwardly toward the top and bottom hearths and toward the preform 51. The enclosure 61 and the top and bottom plates 62 and 63 are insulated from the barrel reflector by refractory material 71.

The reflector 69, the graphite heating element 66, and the hearths 64 and 65 are contacted by an inert gas such as, for example, argon. An inert gas is one that does not react chemically with furnace elements at any furnace operating temperature. In order to maintain an inert environment within the furnace 50, the preform 51 is inserted through a top seal, designated generally by the numeral 80, and the fiber lightguide 52 is withdrawn through a bottom seal, designated generally by the numeral 81.

Figure 2:
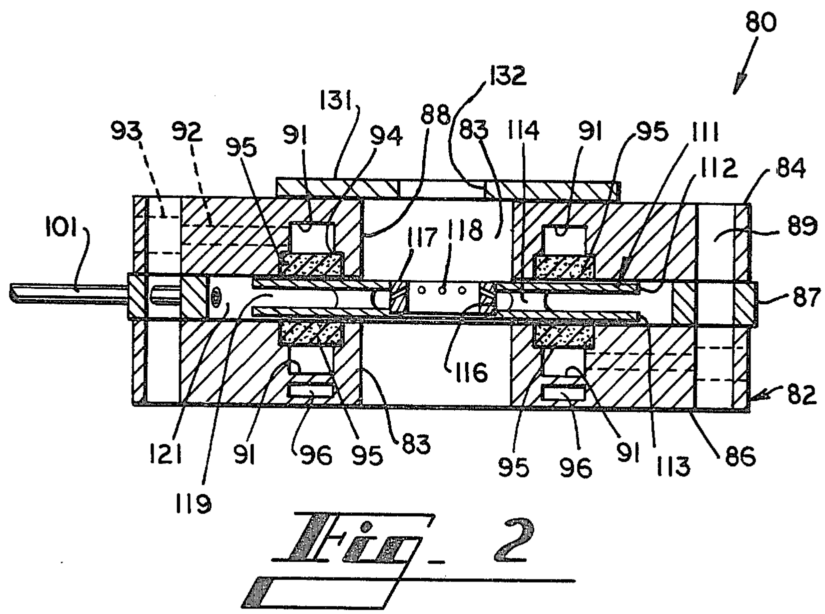
FIG. 2 is an enlarged view of the seal which is included in the furnace shown in FIG. 1.
Figure 3:
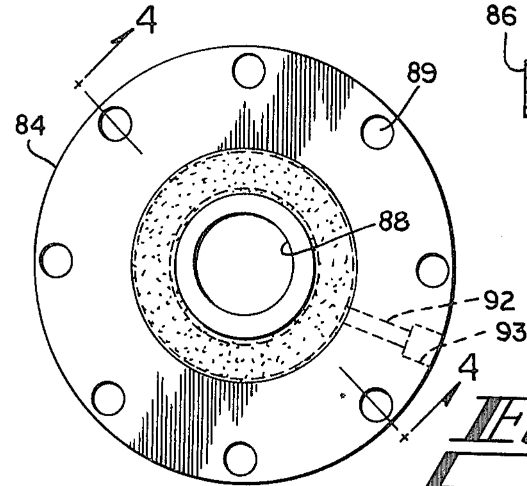
FIG. 3 is a plan view of an outer support member of the seal and which includes facilities for suspending a disc within a cavity created between a pair of support members.
Figure 4:
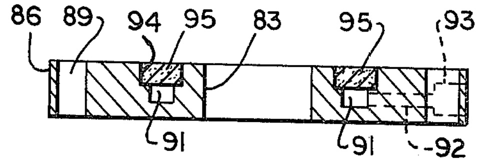
FIG. 4 is an elevation view in section of the member shown in FIG. 3 and taken along lines 4—4.
Figure 5:
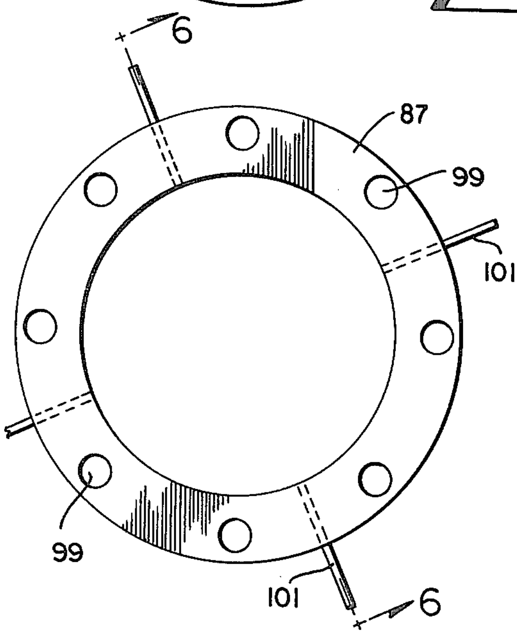
FIG. 5 is a plan view of a spacer which is interposed between a pair of outside support members to form a cavity for receiving the disc.
Figure 7:
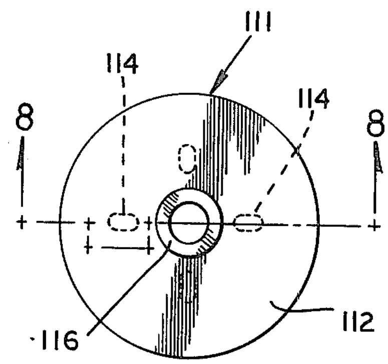
FIG. 7 is a plan view of the disc which is received in the cavity created between a pair of outside members.

The top seal 80 is best shown in FIG. 2 and in a preferred embodiment includes a housing 82 which is attached to the top plate 62 of the furnace 50 such that an opening 83 which extends through the housing is aligned with the vertical axis through the top and bottom hearths 64 and 65. The housing 82 comprises top and bottom annular bearing support members 84 and 86, respectively (see also FIGS. 3 and 4) which are separated by an annular spacer 87 (see FIG. 5).

The top support member 84 includes a centrally disposed opening 88 having a diameter of about 25 mm, for example, and a plurality of openings 89 disposed about its periphery for receiving means for fastening together the discs and the spacer plate. The top support member 84 also icludes an annular reservoir 91 which is connected along a radially extending passageway 92 to a gas inlet port 93 in the peripheral face of the disc. As can best be seen in FIGS. 2 and 4, the top member 84 also includes an annular bearing groove 94 which commmunicates with the reservoir 91 and which receives a porous ring bearing 95 made of a material such as, for example, sintered bronze.

Referring again to FIG. 2, it can be seen that the lower bearing support member 86 is essentially the same construction as the upper support member 84 except that it also includes an annular passageway 96 spaced below the reservoir and connected to a source of cooling water (not shown).

Figure 6:
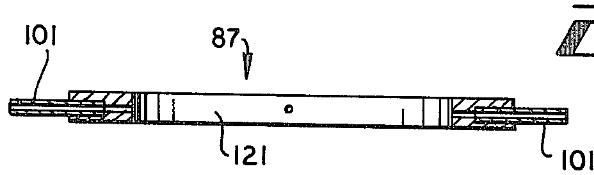
FIG. 6 is an elevation view in section of the spacer shown in FIG. 5 and taken along lines 6—6 thereof.

The spacer 87 (see FIGS. 5 and 6) also includes a plurality of openings 99—99 spaced therealong to coincide with the openings 89—89 in the upper and the lower discs 84 and 86 when the spacer is interposed therebetween. These openings are destined to receive fasteners (not shown) such as, for example, bolts to hold the elements of the seal together. The spacer 87 further includes a plurality of equidistantly spaced passageways 101—101 which are directed radially inwardly toward a vertical axis of the seal 80. These passageways 101—101 as well as the passageways 92—92 are used to supply argon or other uncontaminated inert gas for engagement with the fiber lightguide.

Figure 12:
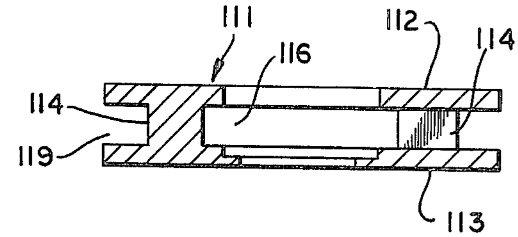
FIG. 12 is an elevational view in section of the disc shown in FIG. 11 and taken along the lines 12—12 thereof.

As can best be seen in FIGS. 2, 7, 8 and 11, the seal 80 also comprises a center disc 111 which is made of a metal such as aluminum and which includes flanges 112 and 113 which are spaced apart by circumferentially disposed spacers 114—114. The spacers 114—114 may be inserts which are separate and apart from the flanges or they may be formed integrally with the flanges. The disc 111 has an opening 116 (see FIG. 12) in which is received an annular insert 117 (see also FIGS. 9-11) made of a metal such as aluminum.

The insert 117 is formed with a center opening 122 through which the preform 51 extends. The opening 122 has a diameter in the range of 8 to 16 mm and for a preform of 12 mm, it has a diameter of about 14 mm. The insert 117 also has a plurality of radially disposed passageways 118—118 which communicate between the center of the insert, through which the preform will extend, and outermost spaces 119 between the flanges. Although the passageways 118—118 could be formed in a horizontal plane, in a preferred embodiment, they are inclined upwardly toward the vertical axis of the housing 82 at an angle of about 15° to a horizontal plane.

These passageways 118—118 could be replaced with a groove, if desired.

The disc 111 is received within a cavity 121 which is formed between the upper and lower support members 84 and 86, respectively, and in proximate engagement with the bearings 95—95 of porous material. It should also be observed from FIG. 2, that the passageways 101—101 of the spacer 87 are aligned with the cavity 119 in the center disc 111 so that the inert gas is directed through the cavity 119 and then through the passageways 118—118 and into engagement with the preform 51 that extends through the insert 117.

This arrangement of the disc 111 within the housing 82 advantageously uses two gas flows to provide a seal 80. The gas flow which is directed through passageways 92—92 in the support members 84 and 86 is used to suspend the disc 111 so that it can be moved laterally of the preform 51 in a plane substantially perpendicular to the preform. The gas which is flowed through the spacer 87 is directed through the passageways 118—118 to engage the preform 51 within the insert 117 at such an angle that it centers the opening 122 concentrically about the preform through a cushion of inert gas to maintain a non-contacting seal. This provides the seal 80 with a self-centering capability in the event that the preform 51 is bowed, has other irregularities, or its axis is not aligned perfectly with the vertical axis of the furnace 50. While an extremely small amount of the gas which is used to suspend the disc 111 enters the opening 116 through which the preform 51 extends, substantially all of the gas which impinges on the preform 51 is supplied through the disc.

Figure 8:
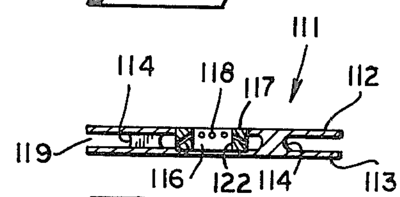
FIG. 8 is an elevation view in section of the disc shown in FIG. 7 and taken along lines 8—8 thereof.
Figure 9:
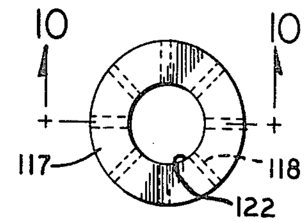
FIG. 9 is a detail view of an insert which is received in an opening through the disc and through which the preform extends.
Figure 10:
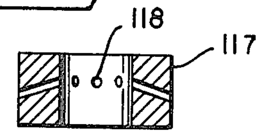
FIG. 10 is an elevation view in section of the insert shown in FIG. 9 and taken along the lines 10—10 thereof.
Figure 11:
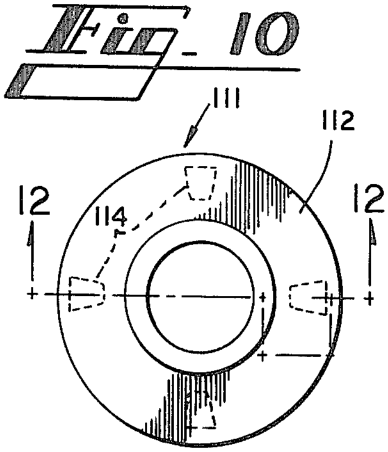
FIG. 11 is a plan view of the disc in FIG. 7 with the insert removed.

Also, the gas flow inwardly through the spacer 87 and through the passageways 118—118 impinges on the preform 51 at such an angle that it divides into two streams. One of the streams is flowed upwardly along the preform 51 to clean it, while the other is directed downwardly into the top hearth 64. The latter prevents the occurrence of the so-called "chimney effect" in which outside air is drawn upwardly through the furnace 50, and also maintains a positive pressure in the furnace so that outside air does not enter and contaminate it when changing preforms. The inclination of the passageways 118—118 as shown in FIGS. 8 and 10 insures that a larger flow of the gas is directed upwardly away from the furnace 50 than downwardly thereinto.

In a preferred embodiment, the furnace 50 also includes a top washer 131 (see FIG. 1) which is supported on the upper member 84. The washer 131 has a central opening 132 which is substantially larger than the opening 122 through the insert 117 but smaller than the opening 88 through the member 84. The washer 131 reduces gas loss and because of its restrictive opening, it creates a higher pressure in the opening 88 than otherwise would be encountered, which is of help in the centering of the disc 111 with respect to the preform 51.

The furnace 50 also includes the lower seal 81 (see FIG. 1) for preventing the escape of gas or the entry of air into the furnace through its lower end. These facilities must also permit an operator to have access to the interior of the furnace 50 in order to grasp a lower end of the preform 50 at start-up of its drawing operation.

Referring now to FIG. 1, the lower seal 81 includes a support block 141 having an opening 142 therethrough and which is attached to the lower cover plate 63. The lower seal 140 also includes a second support block 143 having a stepped opening 144 therein with a shoulder 146 of the larger diameter portion 147 of the opening supporting a flange 148 of a bushing 149. As can be seen in FIG. 1, the diameter of the flange 148 is less than that of the diameter of the large diameter portion 147 to permit the bushing to be moved in a plane laterally with respect to the axis of the furnace 50. The lower end 151 of the bushing 149 extends through a small diameter portion 152 of the lower support block and includes a flange 153.

Again referring to FIG. 1, there is shown a door which comprises two halves 154—154 that are slideably moveable in the flange 153. Each of the halves 154—154 is formed with an inner end having a semicircular cutout 156 so that when the two halves are moved together, the cut-outs form an opening about 3 mm in diameter through which the fiber lightguide 52 is drawn.

Figure 13:
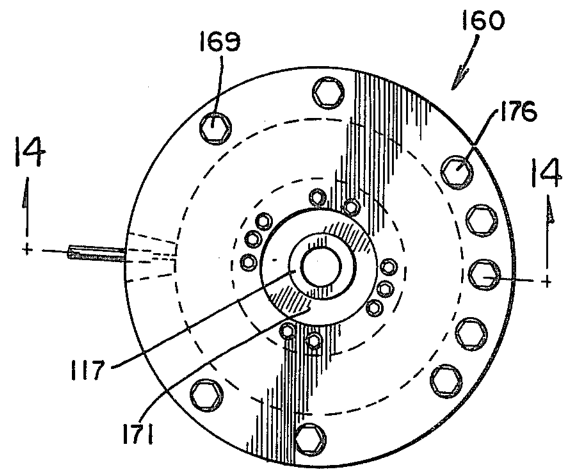
FIG. 13 is a plan view of an alternative embodiment of a seal which may be used with the furnace of FIG. 1.
Figure 14:
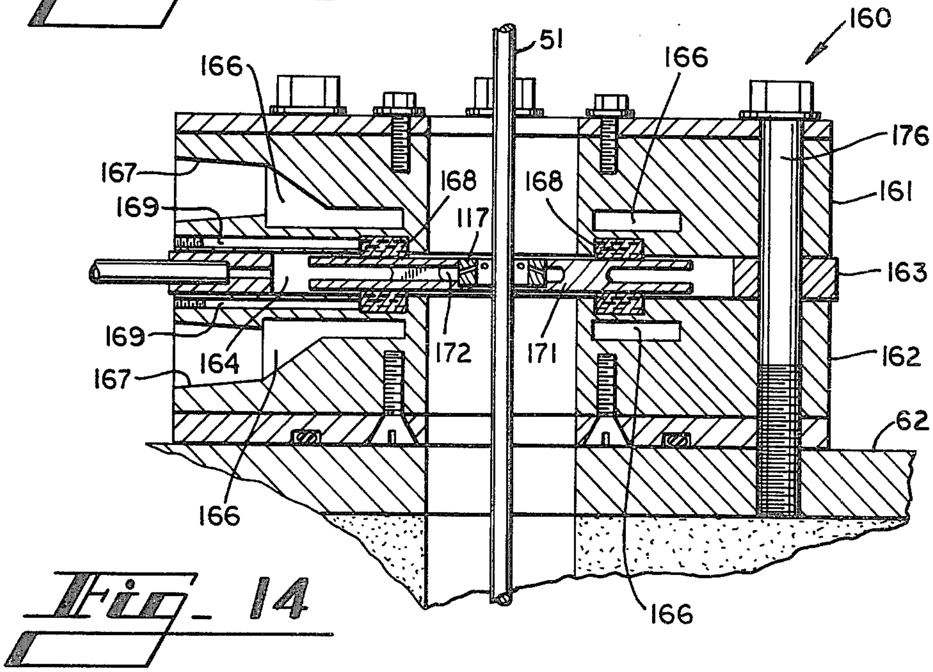
FIG. 14 is an elevation view in section of the seal shown in FIG. 13 and taken along lines 14—14 thereof.
Figure 15:
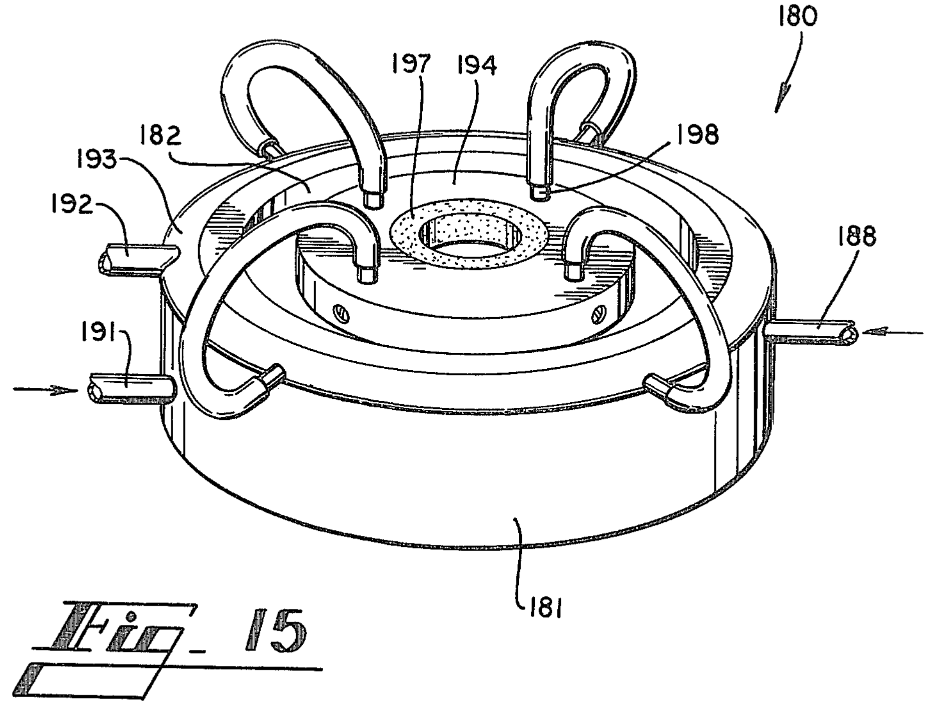
FIG. 15 is a perspective view of a second alternative embodiment of a seal which may be used in the furnace shown in FIG. 1.
Figure 16:
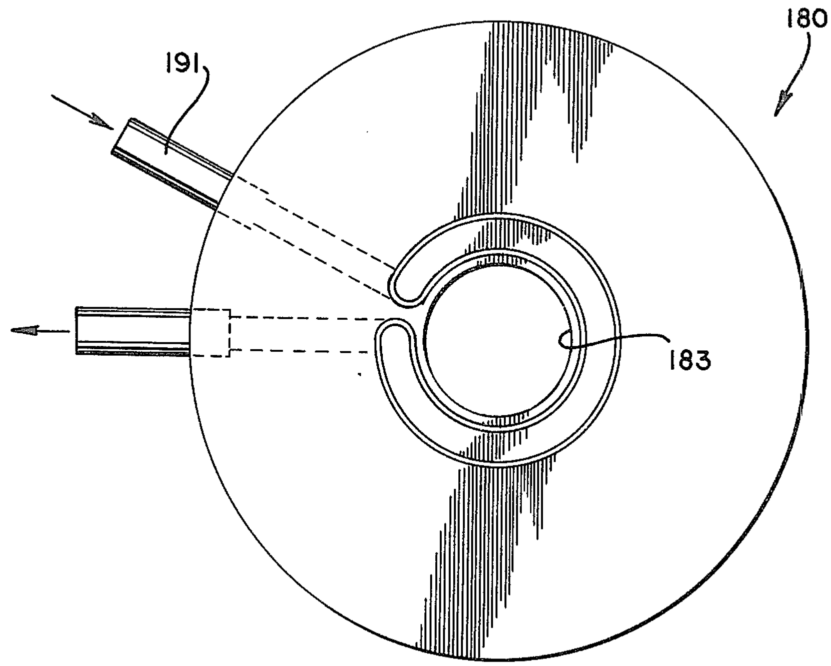
FIG. 16 is a bottom plan view of the seal shown in FIG. 15.

An alternate embodiment seal is shown in FIGS. 13 and 14 and is designated generally by the numeral 160. The seal 160 includes an upper support member 161 and a lower support member 162 which are held apart by a spacer 163 to form a cavity 164 therebetween. Each of the support members 161 and 162 includes an annular opening 166 which is connected through a duct 167 to a source of cooling water (not shown). Further, each of the support members 161 and 162 includes an annular groove 168, which faces into the cavity 164 and which is connected to a source of mercury (not shown) through a passageway 169.

The seal 60 also includes a center disc 171 which is similar in construction to the disc 111 and which is received in the cavity 164. An inert gas which is impinged on the preform 51 is directed inwardly through the disc 171 from a passageway 172 which extends radially through the spacer 163. The entire seal 160 is fastened to the top cover plate 62 of the furnace 50 by bolts 176 which extend through aligned openings in the upper and lower members 161 and 162 and the spacer 163.

The operation of the seal 160 is essentially the same as that of the seal 80 in that a gas is caused to impinge on the preform 51 while a second fluid, in this case mercury, is used to float the center disc 171. The suspension of the disc 171 for lateral movement within the cavity 164 by its contact with the mercury seals 168—168 overcomes problems of surface irregularities and alignment of the preform 51.

In still another embodiment which is shown in FIGS. 15–20, a seal, designated generally by the numeral 180, includes a base 181, having an upper cavity 182 and an opening 183 extending centrally through the base. An annular groove 184 faces into the cavity 182 and receives a porous ring bearing 186 through which an inert gas is directed from a reservoir 187 connected through a passageway 188 to a source (not shown). The base 181 is cooled through chambers 189 connected through a duct 191 to a source of cooling water (not shown) which is also connected through a duct 192 to a tube 193.

The cavity is designed to receive a floating disc 194 that includes a center opening 196 through which the preform 51 extends and in which is positioned an insert 197. An inert gas is fed through supply hoses 198 into radially disposed passageways 199–199 and around a ring tube 201 to flow through the insert 197 into engagement with the preform 51. It should be noted that the insert 197 may be replaced with an insert such as, for example, the insert 117 which was described hereinbefore.

It is to be understood that the above-described arrangements are simply illustrative of the invention. Other arrangements may be devised by those skilled in the art which will embody the principles of the invention and fall within the spirit and scope thereof.

What is claimed is:

1. Apparatus for sealing a treating chamber into which an elongated material extends, which comprises:
- a disc-shaped member adjacent an entrance to the treating chamber and having an opening through which the elongated material extends into the treating chamber without contacting the disc-shaped member when said opening is substantially centered about the elongated material;
- means for supporting the disc-shaped member for movement in a plane substantially perpendicular to the elongated material; and
- means for flowing a gas through the disc-shaped member into the opening and into engagement with the elongated material at an angle such that the disc-shaped member is moved in the plane relative to the elongated material to center its opening about the elongated material, and such that the gas is divided into streams that move along the elongated material in opposite directions to seal the treating chamber.

2. Apparatus for sealing a treating chamber through which an elongated material is advanced, which comprises:
- a housing having a cavity therein which is mounted adjacent an entrance to the treating chamber;
- a disc-shaped member received in the cavity and having a centrally disposed opening through which the elongated material is advanced along a path of travel into the treating chamber without contacting the disc-shaped member when said opening is concentrically disposed about the elongated material;
- means for supporting the disc-shaped member within the cavity for movement in a plane subtantially perpendicular to the path of travel of the elongated material without causing unbalancing moments that could cant the disc-shaped member; and
- means for flowing a gas through the disc-shaped member into the opening and into engagement with the elongated material at an angle such that the disc-shaped member is moved in the plane relative to the elongated material to concentrically dispose its opening about the elongated material and such that the gas is divided into streams which move along the path of travel in opposite directions to seal the treating chamber from the ambient atmosphere.

3. The apparatus of claim 2, wherein the gas which is moved through the dis-shaped member and into engagement with the elongated material is inert.

4. The apparatus of claim 2, wherein the housing includes a pair of spaced annular grooves which oppose each other and face into the cavity and which are connected to a source of gas, and the means for supporting the disc-shaped member includes a ring bearing of porous material which is received in each of the annular grooves such that the disc-shaped member is in proximate engagement with and is supported between the opposing ring bearings by the gas which flows through the grooves and the ring bearings and impinges on its radial faces.

5. The apparatus of claim 2, wherein the housing includes a pair of spaced annular grooves which oppose each other and face into the cavity and the means for supporting the disc-shaped member includes a ring bearing of mercury disposed within each of the grooves and in contact with the disc-shaped member.

6. The apparatus of claim 2, wherein the housing has a stepped opening with the disc-shaped member being disposed in the larger portion of the stepped opening, the elongated material extending through the centrally disposed opening in the disc-shaped member and the smaller portion of the stepped opening through the housing which is aligned with that in the disc-shaped member.

7. The apparatus of claim 2, wherein the housing comprises two annular support members held apart by a spacer, having equiangularly spaced passageways therethrough, to form the cavity therebetween, each of the support members including an annular groove which faces into the cavity and an annular reservoir which communicates with its associated groove and with a source of gas, and wherein the disc-shaped member includes a plurality of radially extending passageways, the passageways in the spacer being connected to a source of gas which flows through the spacer, through the passageways in the disc-shaped member and into engagement with the elongated material.

8. The apparatus of claim 7, which also includes an outer washer-shaped member which is in contact with one of the support members of the housing, the opening through the washer-shaped member being substantially smaller than the opening through the one support member, but non-contacting with the elongated material extending therethrough.

9. The apparatus of claim 2, also including means for sealing an exit end of the treating chamber through which the elongated material is advanced, said means including a bushing having first and second spaced flanges and an opening extending therethrough, said opening having substantially greater cross-sectional dimensions than that of the elongated material, said means further including means for mounting slidably the first flange of the bushing to permit the bushing to be moved laterally of the elongated material.

10. The apparatus of claim 9, wherein the means for sealing the exit end of the treating chamber includes a pair of coacting members with an inner end of each having a generally semicircular opening, said inner ends cooperating to form an opening through which the elongated material extends without contacting the members, and means for mounting the members for sliding movement to permit them to be moved apart to provide access to the treating chamber.

11. A device for sealing a treating chamber into which an elongated material extends, which comprises:
- a housing having a cavity therein which is adapted to be mounted adjacent an entrance to the treating chamber;
- a disc-shaped member received in the cavity and having a centrally disposed opening which is capable of having an elongated material extend therethrough into the treating-chamber without contacting the disc-shaped member when the opening is centered about the elongated material, said disc-shaped member also having a plurality of radially disposed passageways for directing a gas into the opening and into engagement with an elongated material at such an angle that it splits into streams which move in opposite directions along the elongated material to seal the treating chamber; and means for supporting the disc-shaped member for movement in a plane substantially perpendicular to an elongated material so that when the gas is directed into the opening and into engagement with the elongated material at said angle, the opening in the disc-shaped member is centered about the elongated material.

* * * * *